United States Patent
Dreyer et al.

[11] Patent Number: 6,139,389
[45] Date of Patent: *Oct. 31, 2000

[54] ATTACHING METAL TAPE TO A CONDUCTIVE PLASTIC FILM OVERLAYING A CATHODE-RAY TUBE SCREEN

[75] Inventors: Jon Richard Dreyer, San Marcos; Michael William Bates, Ramona, both of Calif.

[73] Assignees: Sony Corporation, Tokyo, Japan; Sony Electronics, Inc., Park Ridge, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/992,833

[22] Filed: Dec. 16, 1997

[51] Int. Cl.[7] .................................... H01J 9/02
[52] U.S. Cl. .................. 445/35; 445/37; 445/23; 348/834
[58] Field of Search .................. 313/479, 421, 313/478; 445/35, 37, 23, 8; 335/210, 211, 212, 213; 29/605; 348/824, 834, 835; 228/111.5

[56] References Cited

U.S. PATENT DOCUMENTS

| | | | |
|---|---|---|---|
| 3,670,394 | 6/1972 | Daniels et al. | 29/470.1 |
| 4,294,392 | 10/1981 | Colloff | 228/111 |
| 4,589,584 | 5/1986 | Christiansen et al. | 228/110 |
| 4,641,196 | 2/1987 | Musha et al. | 358/246 |
| 4,853,791 | 8/1989 | Ginther, Jr. | 358/247 |
| 5,032,920 | 7/1991 | Holden | 358/252 |
| 5,122,619 | 6/1992 | Dlubak | 174/35 R |
| 5,299,726 | 4/1994 | Sauer | 228/111.5 |
| 5,355,578 | 10/1994 | Van Den Berg et al. | 29/605 |
| 5,357,166 | 10/1994 | Sugahara et al. | 313/479 |
| 5,714,834 | 2/1998 | Sieben et al. | 313/440 |
| 5,879,217 | 3/1999 | Saito et al. | 445/23 |

FOREIGN PATENT DOCUMENTS

| | | |
|---|---|---|
| 0323118 | 12/1988 | European Pat. Off. . |
| 0340924 | 4/1989 | European Pat. Off. . |

OTHER PUBLICATIONS

International Search Report—International Application No. PCT/US 98/26405, International Filing Date Dec. 9, 1998.

*Primary Examiner*—Kenneth J. Ramsey
*Assistant Examiner*—Joseph Williams
*Attorney, Agent, or Firm*—Blakely, Sokoloff, Taylor & Zafman LLP

[57] ABSTRACT

A display device comprising a cathode-ray tube, a conductive plastic film overlaying a screen of the cathode ray tube, and a conductive metal tape which is ultrasonically welded to the plastic film to establish an electric connection between the metal tape and the plastic film.

12 Claims, 5 Drawing Sheets

ATTACHING METAL TAPE TO A CONDUCTIVE PLASTIC FILM OVERLAYING A CATHODE-RAY TUBE SCREEN

BACKGROUND OF THE INVENTION

Background Information

A cathode-ray tube, such as is used in a television set, a computer display, or other monitor, includes a screen which gathers static electricity when the cathode-ray tube is functioning. Typically, the tube is manufactured with a film that overlays the screen. The film consists of a number of different layers, each serving a different respective purpose. One or more of the layers is usually constructed of a conductive material such as indium tin oxide (ITO) which serves to conduct the build up of static electricity to an edge of the screen. A metal tape is attached to the film at the edge of the screen and serves to conduct the static electricity further to a ground, such as to a metal implosion protection band of the cathode-ray tube. A good electrical and mechanical connection is required between the metal tape and the film.

An existing method of attaching the metal tape to the film is by perforating the metal tape and engaging the perforations with complementary solder patches which are applied to the film. One of the layers of the film is usually made of a plastics material such as polyethylene teraphthalate (PET) which melts at a temperature below the temperatures of conventional flux soldering techniques. The solder patches therefore have to be applied by means of a special low temperature flux-less ultrasonic soldering iron.

Not only is the tape expensive to manufacture accurately, but the existing process requires a high level of skill and is labor intensive both from the point of view of applying the solder patches and attaching the metal tape to the film.

SUMMARY OF THE INVENTION

The present invention provides an easy but effective method of attaching a conductive metal tape to a conductive plastic film. The metal tape is positioned on the plastic film and is ultrasonically bonded to the film to establish an electrical connection between the metal tape and the film.

In one embodiment, the metal tape is also deformed in a punching operation to provide a good mechanical connection between the metal tape and the plastic film.

The invention also extends to a display device having a cathode-ray tube, a conductive film overlaying a screen of the cathode-ray tube, and a conductive tape which is ultrasonically bonded to the plastic film to establish an electric connection between the metal tape and the plastic film.

BRIEF DESCRIPTION OF THE DRAWINGS

The objects, features and advantages of the present invention will be apparent to one skilled in the art from the following detailed description in which.

DETAILED DESCRIPTION OF THE INVENTION

In the following description, for purposes of explanation, numerous specific details are set forth in order to provide a thorough understanding of the present invention. It will be evident, however, to one skilled in the art that the present invention may be practiced without these specific details. In other instances well known display devices and methods have not been described in detail in order to not obscure the present invention.

Figure 1:
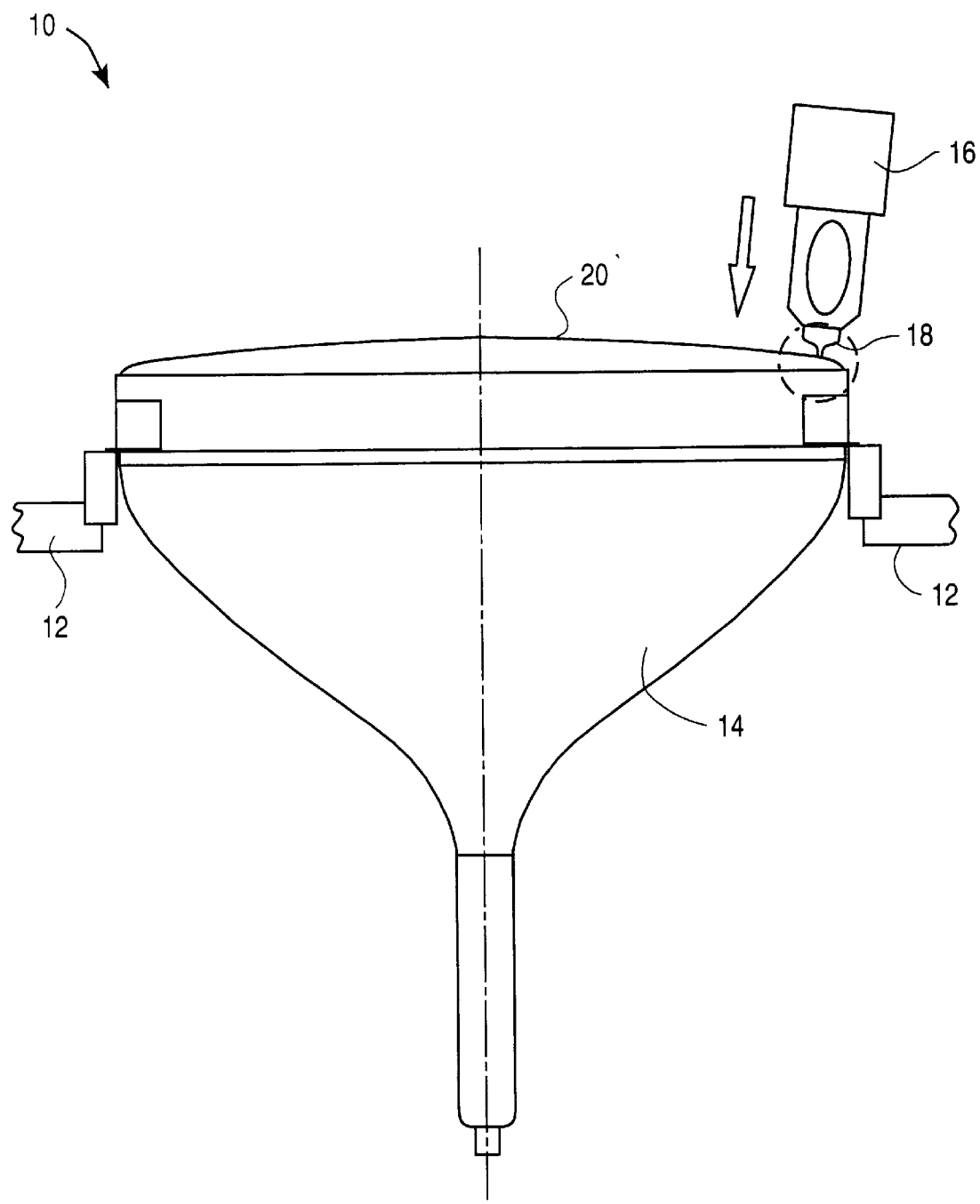
FIG. 1 is a side view illustrating a setup for implementing the method of the present invention.

FIG. 1 of the accompanying drawings illustrates a setup 10, according to one embodiment of the invention, of construction of a display device in accordance with the teachings of the present invention. The setup 10 includes a jig 12 supporting a cathode-ray tube 14, and an ultrasonic bonding head 16 having a bonding tip 18 operating at an edge of a screen 20 of the cathode-ray tube 14.

Figure 2:
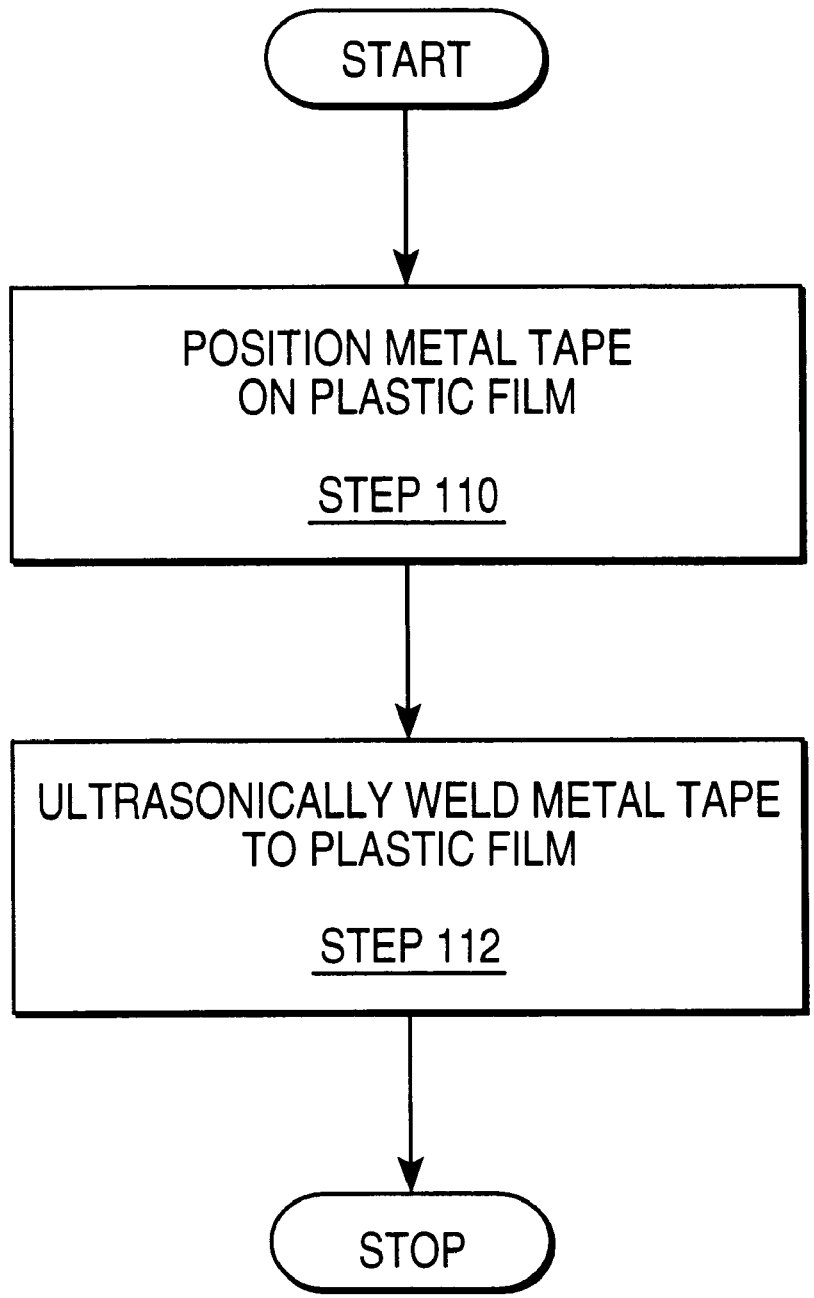
FIG. 2 is a flow chart illustrating the implementation of the method of the present invention.

FIG. 2 is a flow chart illustrating the implementation of the present invention. In step 110 a metal tape is positioned on a plastic film and in step 112 the metal tape is ultrasonically welded to the plastic film. Particulars of the method of FIG. 2 will become apparent in the discussion that follows.

Figure 3:
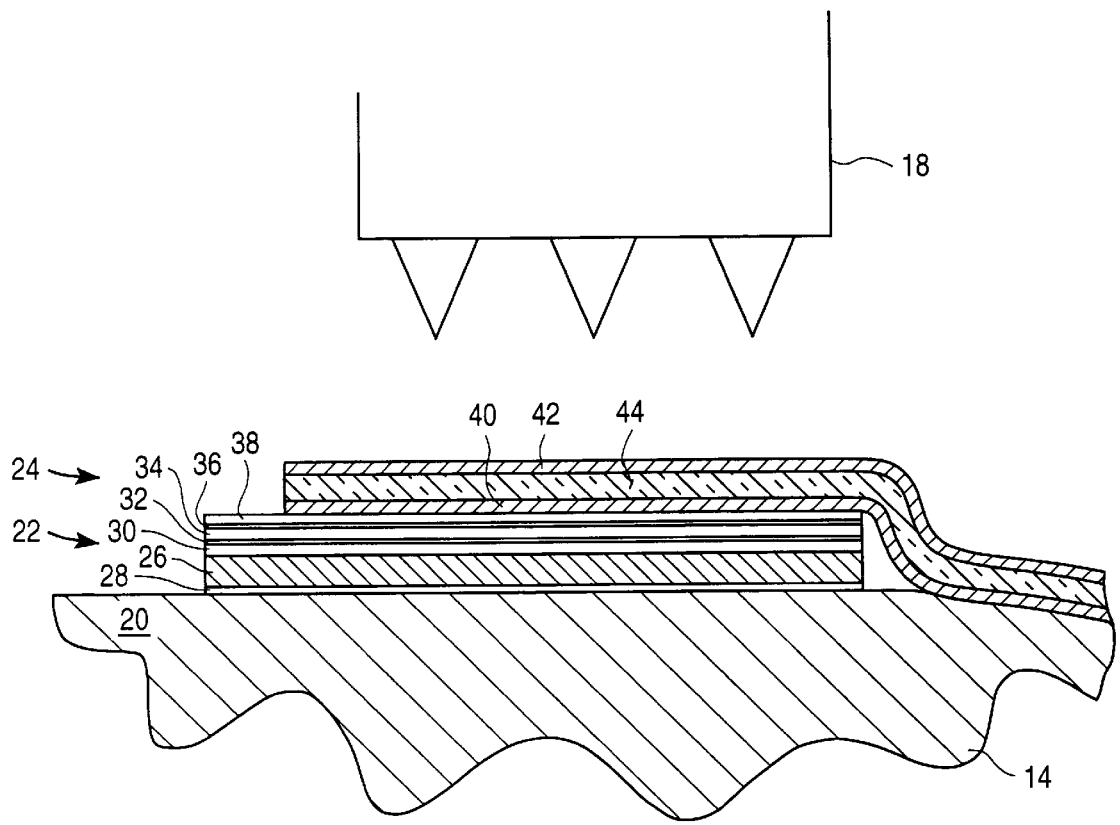
FIG. 3 is an enlarged view of a portion of FIG. 1.

FIG. 3 is an enlarged view of FIG. 1 showing the bonding tip 18 and the edge of the screen 20. A transparent film 22 overlays the screen 20 and a metal tape 24 is attached to the film 22, in accordance with step 110 of FIG. 2.

The film 22 comprises a plastic layer 26 adhering to the screen 20 by means of adhesive 28, with consecutively a first anti-reflective layer 30, a first conductive layer 32, a second anti-reflective layer 34, a second conductive layer 36 and a protective layer 38 thereon.

The plastic layer 26 is typically of polyethylene teraphthalate (PET), the anti-reflective layers 30 and 34 of silicon dioxide, the conductive layers 32 and 36 of indium tin oxide (ITO) and the protective layer 38 is typically a Teflon layer. Other embodiments are also contemplated. Specific aspects of the film 22 are known in the art and are not discussed in detail herein. As noted earlier, static electricity builds up on the screen 20 during functioning of the cathode-ray tube 14. The conductive layers 32 and 36 serve to conduct the built up of static electricity to an edge of the screen 20. Also of note is that the plastic layer 26 melts at a temperature below the temperatures of conventional flux soldering techniques.

In one embodiment, the metal tape 24 includes an adhesive inner layer 40 adhering to the film 22, an outer insulating layer 42 and a conductive core 44 in the form of a metal foil.

Once bonded to the film, the metal tape 24 serves to conduct the static electricity from the edge of the screen to a ground, such as to a metal implosion protection band of the cathode-ray tube 14. A good electrical connection is thus required between the conductive layers of the film, 32 and 36, and the conductive core 44 of the metal tape 24.

Figure 4:
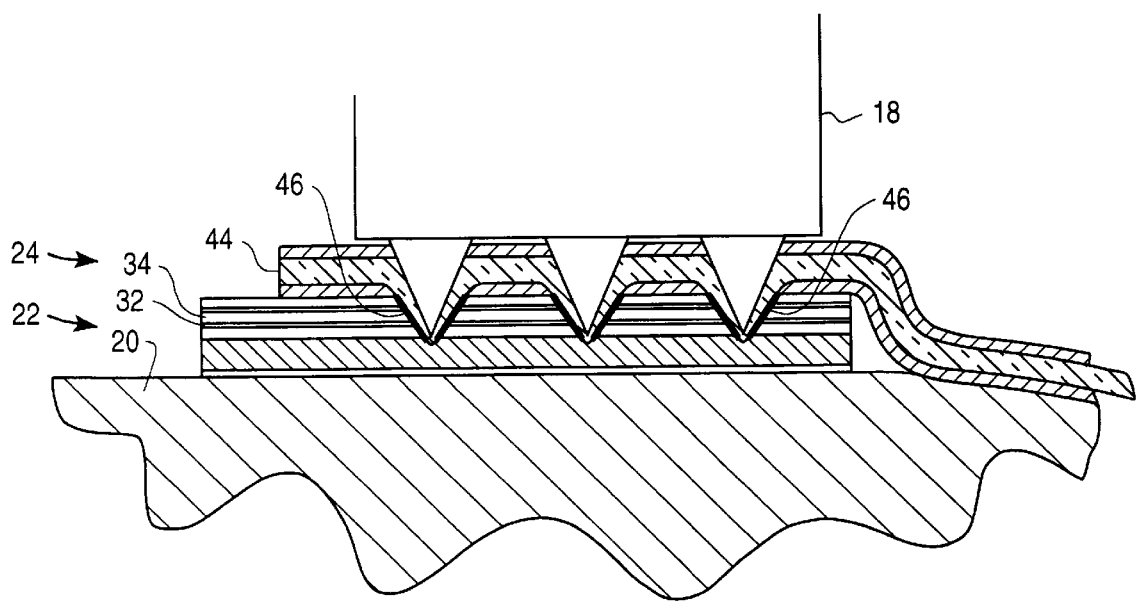
FIG. 4 is a view, similar to FIG. 3, illustrating one embodiment of an ultrasonic bonding operation in accordance with the teachings of the present invention.

In one embodiment, the tape is perforated to provide a better electrical connection. FIG. 4 illustrates prongs of the bonding tip 18 punching into the metal tape 24 and the film 22. The bonding tip 18 is shaped in such a way that the prongs penetrate the metal tape 24 and the film, thus perforating and deforming the metal tape 24 into the film 22 at a number of locations. The conductive core 44 is brought into contact with the conductive layers 32 and 34 by the punching operation. Relatively low pressure exists at this stage between the metal tape 24 and the film 22, when compared to conventional ultrasonic bonding operations between metal and metal. The pressure between the metal tape 24 and the film 22 is typically of the order of between 400 kPa and 1100 kPa. Conventional metal-to-metal ultrasonic welding procedures typically utilize pressures which are three to four times as high as the pressure referred to.

The bonding tip 18 is then ultrasonically vibrated. A relatively low frequency of vibration of, for example, 20 kHz generally results in an amplitude which is higher than a relatively high frequency of vibration of, for example, 40 kHz. In certain instances the amplitude may be required to be relatively low for which a frequency of vibration of between 30 kHz and 40 kHz would be preferred.

The pressure and ultrasonic vibration causes localized heating at an interface between the conductive core 44 and the layers of the film 22, resulting in a fusion bond 46 forming between the conductive core 44 and the layers of the film 22, in accordance with step 112 of FIG. 2.

The bonding tip 18 is then retracted, leaving a display device comprising the cathode-ray tube 14, the conductive plastic film 22 overlaying the screen 20 of the cathode-ray tube 14, and the conductive metal tape 24 which is ultrasonically bonded to the film 22.

An electrical connection is thus established between the metal tape 24 and the film 22, allowing for a conductive path for static electricity from the screen to the metal tape 24. A good mechanical bond is also produced by the deformation of the metal tape 24 into the film 22 and by the fusion bond 46 between the metal tape 24 and the film 22.

The electrical and mechanical connections are established without the need, such as in the existing method, of preforming either the metal tape 24 or the film 22 with interconnecting structures such as solder patches on the film and the complementary perforations in the metal tape. The ultrasonic welding process is therefore cheaper, less labor intensive, and requires a lower level of skill when compared to the existing method. Moreover, the metal tape 24 is welded to the film 24 utilizing a localized welding temperature which is not so high as to cause melting of the plastic layer 26 or any one of the other layers of the film 22.

It is also important to note that an electrical connection is established between the metal tape and the conductive layers 32 and 36 of the film utilizing relatively low pressure when compared to conventional metal--to-metal ultrasonic welding procedures, thus reducing the chances of damage to the metal tape, the film or the screen.

As mentioned previously, the pressure between the metal tape 24 and the film 22 is preferably between 400 kPa and 1100 kPa. A lower pressure is preferred for purposes of preventing damage to the screen 20, the film 22 and the metal tape 24. However, it may not always be desirable to apply a pressure that is too low, for example when too low a pressure may result in some loss of control of the pressure during ultrasonic bonding. The bonding tip may be optimized so as to obtain the required amount of pressure which is exerted between the metal tape 24 and the film.

Figure 5:
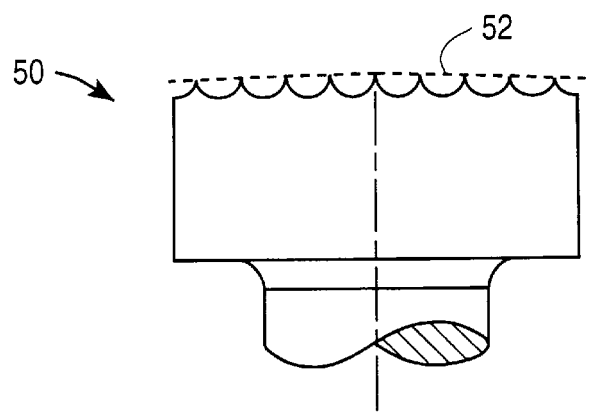
FIG. 5 is a side view of a bonding tip for use in carrying out the invention.
Figure 6:
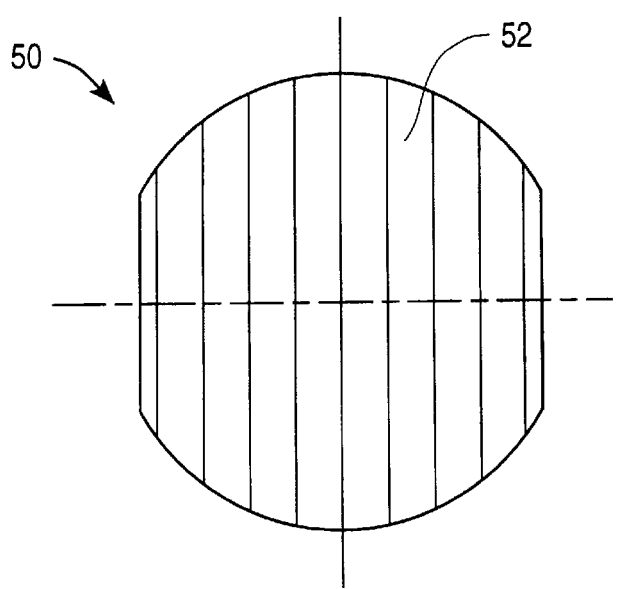
FIG. 6 is a plan view of the bonding tip of FIG. 5.
Figure 7:
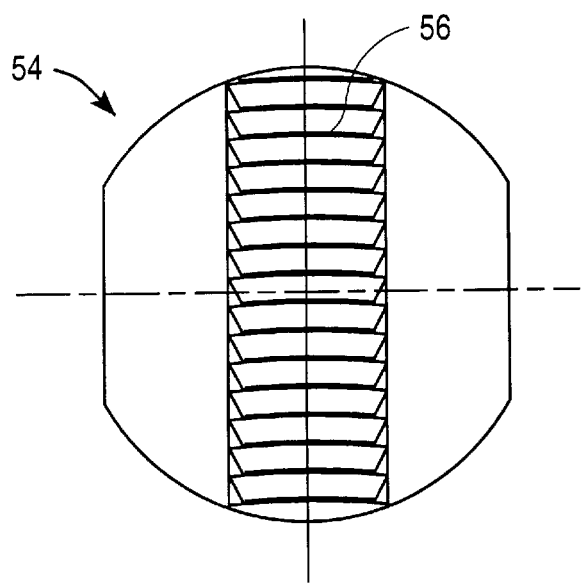
FIG. 7 is a plan view of another bonding tip for use in carrying out the invention.

FIGS. 5 and 6 illustrate a bonding tip 50 having a surface 52 for contacting the metal tape 24. FIG. 7 illustrates another bonding tip 54 which also has a surface 56 for contacting the metal tape 24. The surface 52 of FIG. 6 is serrated over substantially the entire projection of the bonding tip 50, whereas the surface 56 of FIG. 7 is smaller than the projection of the bonding tip 54.

A reduced surface area, such as in FIG. 7, leads to an enlargement in pressure exerted by the bonding tip, given the same amount of force (e.g., P=F/A). As a practical example, the force may be 52.8 kN. The surface 52 may have an area of 1,2 cm² which would result in a pressure of 440 kPa. The surface 56 may have an area of 0,48 cm², which would, having .48/1.2 or 40% of the area of surface 52, result in a pressure of 1100 kPa.

The invention has been described in conjunction with the preferred embodiment. It is evident that numerous alternatives, modifications, variations and uses will be apparent to those skilled in the art in light of the foregoing description.

What is claimed is:

1. A method, comprising:

presenting a cathode-ray tube screen;

overlaying a conductive plastic film onto the cathode-ray tube screen;

positioning a metal tape on the conductive plastic film;

deforming a portion of the metal tape into a portion of the conductive plastic film by first perforating the metal tape with a projection and then perforating the conductive plastic tape with at least one of the metal tape and the projection.

2. The method of claim 1, wherein deforming a portion of the metal tape includes at least one of applying pressure over the metal tape and against the cathode-ray tube screen and vibrating the projection.

3. The method of claim 2, wherein applying pressure includes applying pressure between 400 kPa and 1100 kPa.

4. The method of claim 2, wherein vibrating the projection includes vibrating a plurality of prongs at a frequency between 20 kHz and 30 Khz.

5. The method of claim 4, wherein vibrating a plurality of prongs includes vibrating a plurality of prongs disposed on a surface of a bonding tip.

6. The method of claim 5, wherein the surface of the bonding tip has an area and the plurality of prongs are disposed within no more than 40% of this area.

7. The method of claim 1 wherein deforming a portion of the metal tape includes forming a fusion bond between a conductive core of the metal tape and a layer of the conductive plastic tape.

8. A display device comprising:

a cathode-ray tube screen;

a conductive plastic film overlain onto the cathode-ray tube screen, the conductive plastic film having a perforation extending into the conductive elastic film;

a metal tape positioned on the conductive plastic film, the metal tape having a perforation extending through the metal tape so as to deform a portion of the metal tape, wherein the portion of the metal tape extends into the perforation of the conductive plastic film.

9. The display device of claim 8 wherein the perforation of the metal tape includes a plurality of holes.

10. The display device of claim 8 further comprising:

an adhesive layer disposed between the metal tape and the conductive elastic film.

11. The display device of claim 8, further comprising:

a fusion bond disposed between a conductive core of the metal tape and a layer of the conductive elastic tape.

12. The display device of claim 11 wherein a conductive layer disposed in the conductive plastic tape is in electrical contact with a conductive layer disposed in the metal tape.

* * * * *